US008856227B2

(12) United States Patent
Choi et al.

(10) Patent No.: US 8,856,227 B2
(45) Date of Patent: Oct. 7, 2014

(54) COMMUNICATION METHOD AND APPARATUS USING VIRTUAL SINK NODE IN WIRELESS SENSOR NETWORK

(75) Inventors: Hyo Hyun Choi, Seoul (KR); Sun Gi Kim, Seoul (KR); Lynn Choi, Seoul (KR); Jae Kyun Jung, Seoul (KR)

(73) Assignees: Samsung Electronics Co., Ltd., Samsung-ro, Yeongtong-gu, Suwon-si, Gyeonggi-do (KR); Korea University, Korea Univ., Anam-dong, Seongbuk-gu, Seoul (KR)

( * ) Notice: Subject to any disclaimer, the term of this patent is extended or adjusted under 35 U.S.C. 154(b) by 1271 days.

(21) Appl. No.: 12/370,709

(22) Filed: Feb. 13, 2009

(65) Prior Publication Data

US 2009/0207783 A1 Aug. 20, 2009

(30) Foreign Application Priority Data

Feb. 14, 2008 (KR) ........................ 10-2008-0013469

(51) Int. Cl.
*G06F 15/16* (2006.01)
*H04W 40/02* (2009.01)
*H04W 40/20* (2009.01)

(52) U.S. Cl.
CPC ............ *H04W 40/20* (2013.01); *H04W 40/026* (2013.01); *Y02B 60/50* (2013.01)
USPC ............ 709/204; 709/203; 370/235; 370/236

(58) Field of Classification Search
USPC ............................. 709/204, 203; 370/235, 236
See application file for complete search history.

(56) References Cited

U.S. PATENT DOCUMENTS

| 6,798,765 | B2 * | 9/2004 | Larsson ........................ 370/351 |
| 7,006,453 | B1 * | 2/2006 | Ahmed et al. ................ 370/255 |
| 7,349,664 | B2 * | 3/2008 | Ochi et al. .................... 455/11.1 |
| 7,447,174 | B2 * | 11/2008 | Joshi ............................. 370/328 |
| 7,720,993 | B2 * | 5/2010 | Liu et al. ....................... 709/238 |
| 2004/0218548 | A1 * | 11/2004 | Kennedy et al. .............. 370/254 |
| 2005/0190717 | A1 * | 9/2005 | Shu et al. ...................... 370/328 |
| 2005/0243735 | A1 * | 11/2005 | Kashima ....................... 370/254 |
| 2006/0126535 | A1 * | 6/2006 | Sherman ....................... 370/254 |
| 2006/0153154 | A1 * | 7/2006 | Yoon et al. .................... 370/338 |
| 2006/0199530 | A1 * | 9/2006 | Kawasaki ........................ 455/7 |
| 2008/0188177 | A1 * | 8/2008 | Tan et al. ..................... 455/11.1 |
| 2009/0122738 | A1 * | 5/2009 | Chen et al. ................... 370/312 |

FOREIGN PATENT DOCUMENTS

KR 10-2006-0132113 A 12/2006

* cited by examiner

*Primary Examiner* — Duyen Doan
(74) *Attorney, Agent, or Firm* — Cha & Reiter, LLC

(57) ABSTRACT

A communication method and apparatus using a virtual sink node in a wireless sensor network, in which location information about a destination node is acquired by a source node. If the location of the destination node is out of a transmission range of the source node, data including the location information about the destination node are transmitted from the source node to one of nodes adjacent to the source node, where the one node is typically closest to the destination node. The data are transmitted from the one node to another one of nodes adjacent to the one node, where another node is closest to the destination node, until the destination node is located within a transmission range of the one node. If the destination node is located within the transmission range of the one node, the data are transmitted from the one node to the destination node.

26 Claims, 8 Drawing Sheets

COMMUNICATION METHOD AND APPARATUS USING VIRTUAL SINK NODE IN WIRELESS SENSOR NETWORK

CLAIM OF PRIORITY

This application claims priority to an application entitled "COMMUNICATION METHOD AND APPARATUS USING VIRTUAL SINK NODE IN WIRELESS SENSOR NETWORK" filed in the Korean Intellectual Property Office on Feb. 14, 2008 and assigned Serial No. 10-2008-0013469, the contents of which are incorporated herein by reference in its entirety.

BACKGROUND OF THE INVENTION

1. Field of the Invention

The present invention relates to wireless sensor networks, and more particularly, to a communication method and apparatus using a virtual sink node in a wireless sensor network.

2. Description of the Related Art

In recent years, with the steady growth of Internet, wireless sensor network technology has been put to practical use in a variety of industrial fields. The development of low-priced sensors, the changing environment of international standards, etc., have all contributed to the advancement of this technology. In general, sensor networks detect information through sensors and process the detected information. Through the use of sensor networks, advancements have been achieved to improve everyday living and provide a variety of benefits in the application of science and technology. Sensor networks refer to a wireless network that serves to implement ubiquitous computing and includes a plurality of sensors that are light in weight and consume low power.

The conventional study of sensor networks has progressed without considering the issues created from the mobility of respective nodes in the sensor network. On the contrary, sensor networks have characteristics where each network includes a plurality of sensors, each of sensor nodes has restricted power and computing capability, and the topology of the sensor network can be easily changed because sensor nodes are inserted and removed into and from the network as the sensor nodes are frequently moved. Therefore, a study needs to be conducted that considers the mobility of respective nodes.

The conventional study of networks in an environment assuming node mobility has been with respect to a mobile ad-hoc network (MANET). However, studies on a routing method assuming the node mobility are only at the beginning stage. Examples of a routing protocol of the conventional MANET that provides support to nodes having mobility are: destination sequence distance vector (DSDV), ad-hoc on-demand distance vector (AODV), dynamic source routing (DSR), etc. These routing protocols use a method for periodically updating routing information through flooding, where each node includes a routing table to maintain a route between moving nodes, or a route searing technique of an on-demand method using flooding to detect a route of moving nodes.

However, since the route search of an on-demand method is performed, assuming a "many-to-many" communication environment but not assuming the restriction of devices, there has been a limitation of application to a sensor network that collects data in a sink node. That is, since the network performs frequent flooding to search a location of a sink node and thus increase its traffic, collision is increased and a large amount of energy is consumed. Therefore, the conventional sensor network, which must include limited resources according to the features of the devices, is difficult to apply to nodes.

SUMMARY OF THE INVENTION

The present provides a routing method and apparatus adapted to a "many-to-one" communication environment in a sensor network composed of mobile nodes. It also provides a routing method and apparatus that can reduce energy consumption and transmission delay.

In accordance with an exemplary embodiment of the present invention, the present invention provides a communication method in a sensor network that preferably includes: acquiring location information about a destination node by a source node; transmitting, if the location of the destination node is out of a transmission range of the source node, data including the location information about the destination node from the source node to a first one node ("first node") of the nodes adjacent to the source node, where the first one node adjacent to the source node is closest to the destination node; transmitting the data from the first node to a second one of the nodes ("second node") adjacent to the first node, wherein the second node is closest to the destination node, until the destination node is located within a transmission range of the first node; and transmitting, if the destination node is located within the transmission range of the first node, the data from the first node to the destination node.

Preferably, the communication method may further include transmitting, if a hole occurs, the data through a previously stored history node by the source node and a node including the first node.

Preferably, the history node may be included in a route through which the destination node transmitted its location information to the source node.

Preferably, the communication method may further include: transmitting, if the data are missed due to movement of one or more history nodes, a routing request message from a node having detected the missed data to the destination node; receiving a routing response message, in response to the routing request message, from the destination node; and restoring a transmission route.

Preferably, the adjacent nodes are located within the transmission range of the source node.

Preferably, the destination node may comprise a virtual sink node if the source node is a sensor node, and the destination node is a sink node if the source node is a virtual sink node.

Preferably, the location information is received through a GPS satellite.

Preferably, the communication method further includes: storing, by all nodes including the source node and the adjacent nodes, location information about nodes adjacent to all the respective nodes.

Preferably, storing the location information includes: transmitting, by only a moving node from among all the nodes, and location information to adjacent nodes of the moving node that are within transmission range; and transmitting, if a node not having moved receives location information about an adjacent node that is newly located within its transmission range, the location information from the node having not moved is provided to the new adjacent node.

In accordance with another exemplary embodiment of the present invention, the present invention provides a communication method in a sensor network including a plurality of sensor nodes and a sink node, the communication method preferably includes: selecting, by the sink node, a first sensor node from among the plurality of sensor nodes for designation as a virtual sink node; acquiring, by the virtual sink node, location information about the sink node; transmitting location information about the virtual sink node from the virtual sink node to a second sensor node; and transmitting data sensed by the second sensor node to the sink node through the virtual sink node.

Preferably, transmitting the data includes: transmitting data repeatedly, in which the repeatedly transmitting data includes location information about the virtual sink node, to a node closest to the virtual sink node, which is one of the nodes between the sensor node and the virtual sink node and from the adjacent nodes of the sensor node, until the data arrive at the virtual sink node; and transmitting data repeatedly, which include location information about the sink node, to a node closest to the sink node, which is one of the nodes between the virtual sink node and the sink node and from the adjacent nodes of the virtual sink node, until the data arrive at the sink node.

Preferably, selecting a first one node from among the plurality of sensor nodes is to select a node from the sensor nodes, whose energy amount is greater than a preset critical value, as a virtual sink node.

Preferably, if the selected virtual sink node has less energy than a preset critical value, selecting one node from among the plurality of sensor nodes to newly select the one node from the sensor nodes, whose energy amount is greater than the preset critical value, as a virtual sink node.

Preferably, acquiring location information is performed as the virtual sink node receives location information about the sink node from the sink node by a unicast method.

Preferably, the transmitting location information includes: transmitting location information about the virtual sink node by a broadcast method; and transmitting the broadcast location information to the sensor node by flooding.

In accordance with another exemplary embodiment of the present invention, the present invention provides a communication apparatus for a sensor network including: a plurality of sensor nodes for sensing particular data and transmitting the sensed data to the other nodes; and a sink node for selecting at least one from the plurality of sensor nodes as a virtual sink node and receiving the data through the virtual sink node.

Preferably, the sensor node will continues to transmit the data, which includes location information about the virtual sink node, to a node from among nodes adjacent to the sensor node being closest to the virtual sink node, until the data arrives at the virtual sink node.

Preferably, the virtual sink node continues to transmit the data, which includes location information about the sink node, to a node from among nodes adjacent to the virtual sink node being closest to the sink node, until the data arrives at the sink node.

Preferably, according to an exemplary aspect of the invention, the sensor node and the virtual sink node transmit the data through a previously stored history node when a hole occurs during the data transmission.

Preferably, according to an exemplary aspect of the invention, if the data are missed as the history node is moved, the sensor node and the virtual sink node transmits a routing request message to a destination node and receives a routing request response message from the destination node to stores a routing path.

Preferably, according to an exemplary aspect of the invention, the sensor node transmits its location information to its adjacent nodes within its transmission range only while it is moving.

Preferably, according to an exemplary aspect of the invention, if the sensor node receives location information about an adjacent node that newly moves in its transmission range while it does not move, the sensor node transmits its location information to the new adjacent node.

Preferably, according to an exemplary aspect of the invention, the sink node selects nodes from among the sensor nodes as a virtual sink node, in which the selected sensor nodes have an amount of energy that is equal to or greater than a preset critical value.

Preferably, if the energy of the virtual sink node is less than a preset critical value, the sink node selects new nodes from among the sensor nodes as a virtual sink node, in which the selected sensor nodes have an amount of energy that is equal to or greater than a preset critical value.

Preferably, the virtual sink node does not move immediately after being selected as a virtual sink node.

Preferably, the sensor node and the sink node include a GPS receiver and receive their location information through the GPS receiver.

BRIEF DESCRIPTION OF THE DRAWINGS

The features and advantages of the present invention will become more apparent from the following detailed description in conjunction with the accompanying drawings, in which.

DETAILED DESCRIPTION

Hereinafter, exemplary embodiments of the present invention are described in detail with reference to the accompanying drawings. Detailed descriptions of well-known functions and structures incorporated herein may be omitted to avoid obscuring appreciation of the subject matter of the present invention by a person of ordinary skill.

Prior to explaining the exemplary embodiments of the present invention discussed herein, there are assumptions included for convenient description of the present description below: Sensor nodes have mobility. For example, it is assumed that respective nodes are mounted on mobile bodies and move therewith. It is assumed that the mobility of the sensor nodes is classified into two models. That is, the mobility models are classified into: (1) a random waypoint model and (2) a group mobility model. In the random waypoint model, respective nodes move in an arbitrary direction, where, in order to change the direction of the respective nodes, they move for a certain period of time, stop, and then change direction. In the group mobility model, although nodes move in different directions, respectively, the group including moving nodes moves in a uniform direction.

In the following description, the configuration of a sensor network according to an exemplary embodiment of the present invention is explained with reference to FIG. 1.

Figure 1:
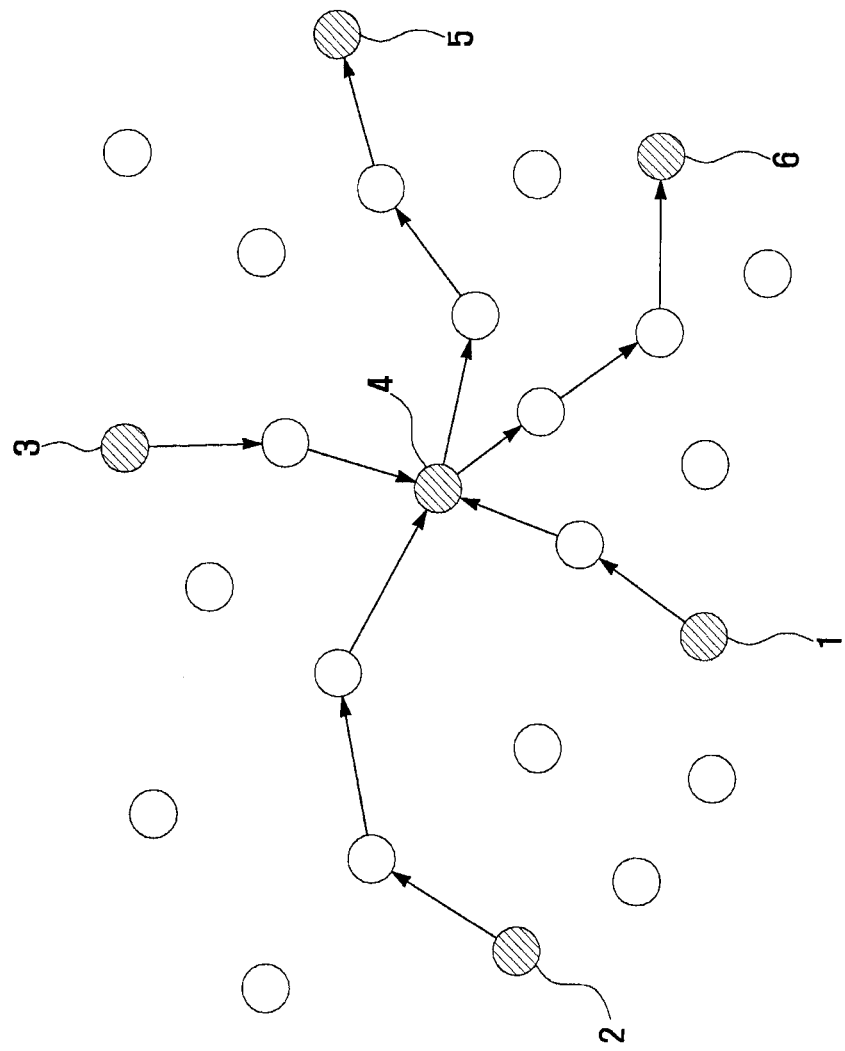
FIG. 1 is a view illustrating a topology of a sensor network according to an exemplary embodiment of the present invention.

FIG. 1 is illustrates a topology of a sensor network according to an exemplary embodiment of the present invention. The sensor network includes, for example, a sink node, a virtual sink node and a sensor node. These respective nodes are wireless communication devices having a wireless interface for wireless communication. These respective nodes in this example comprise, for example, subminiature low power devices and have a size of about somewhere in the vicinity of 1 mm$^3$. These respective nodes may serve as a sensor node in terms of their functions. Each node includes a sensor for sensing particular data, an analog-to-digital (AD) converter for converting sensed data to digital signals, a processor for processing data, a memory, a battery for supplying power, and a wireless transceiver for transmitting/receiving data. In an exemplary embodiment of the present invention, each node includes, for example, a receiver, such as a global positioning system (GPS) receiver. Each node receives and stores its geographical location information from a GPS satellite through the GPS receiver, which is hereinafter called "location information." Location information includes but is not limited to, for example, latitude, longitude, and altitude.

Nodes including a sink node, a virtual sink node, and a sensor node that are deployed in a certain area, forming a network, and sense particular data from the area to provide them to a user. According to the function, the nodes are classified into a sink node, a virtual sink node, and a sensor node.

The topology of the sensor network is shown in FIG. 1, where reference numbers 1, 2, and 3 denote a sensor node, 4 denotes a virtual sink node, and 5 and 6 denote a sink node. The other elements without reference numbers denote a sensor node.

As shown in FIG. 1, sensor nodes 1, 2, and 3 sense data relating to geographical or environmental change, for example, temperature, humidity, etc., on the area where they are installed. These sensor nodes 1, 2, and 3 have a limitation in terms of transmission range and thus transmit sensed data to a virtual sink node 4 in a multi-hop method. The virtual sink node 4 serves to transmit the sensed data to the sink nodes 5 and 6. The virtual sink node 4 is set as the sink nodes 5 and 6 select at least one from among the sensor nodes. The sink nodes 5 and 6 manage and control the virtual sink node 4 and sensor nodes 1, 2, and 3 in the sensor network, and also collect data sensed by the sensor nodes 1, 2, and 3. In particular, the sink nodes 5 and 6 manage a network by designating the virtual sink node 4 or change the designation of a virtual sink node. The sink nodes 5 and 6 also transmit collected data to a gateway, where the gateway refers to a device that can transmit sensed data to an external network, such as a host, etc. In other words, the sensor network senses data through sensor nodes 1, 2, and 3 in a particular area, collects sensed data to the sink nodes 5 and 6 through the virtual sink node 4, and transmits them to an external network, such as the Internet, etc., through the sink nodes 5 and 6. Consequently, a user can use the sensed data collected in the sensor network.

In an exemplary embodiment of the present invention, the sensor nodes 1, 2, and 3 transmit data to the virtual sink node 4, and then the virtual sink node 4 transmits them to the sink nodes 5 and 6. In such data transmission, a node starting data transmission is called a "source node," and a node that the source node designates as the final point for data transmission is called a "destination node." In order to designate a destination node and transmit data thereto, the location or address of the destination node must be recognized. In an exemplary embodiment of the present invention, since data are transmitted using location information, the source node needs to have location information about a destination node.

In an exemplary embodiment of the present invention, the destination node of sensor nodes 1, 2, and 3 is the virtual sink node 4 and the destination node of the virtual sink node 4 becomes the sink nodes 5 and 6. Thus, two nodes are designated as the destination node.

Figure 2:
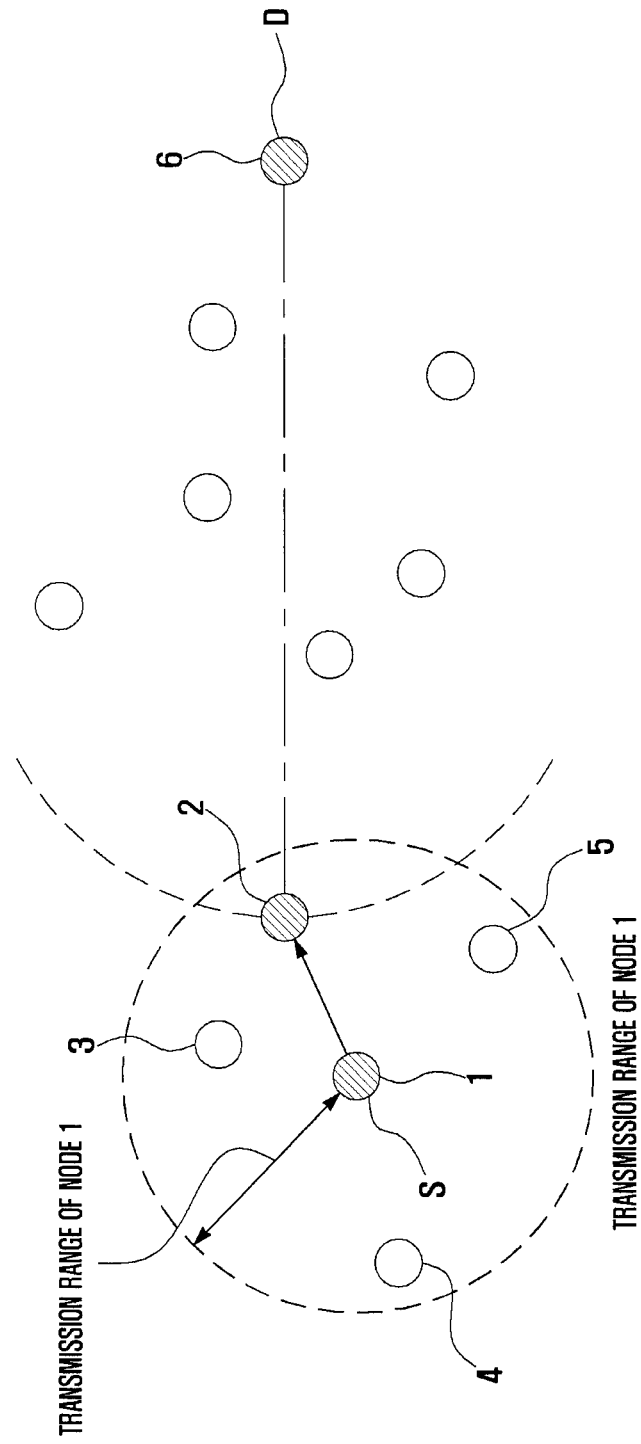
FIG. 2 is a view describing a method for transmitting data, according to an exemplary embodiment of the present invention.

In the following description, a method for transmitting data from a source node to a destination node is described in detail with reference to FIG. 2. FIG. 2 is a view describing a method for transmitting data, according to an exemplary embodiment of the present invention.

Data transmission from a source node S(1) to a destination node D(6): When a sensor node transmits data to a virtual sink node, the sensor node is a source node S(1) and the virtual sink node is a destination node D(6). In addition, if a virtual sink node transmits data to a sink node, the virtual sink node is a source node S and the sink node is a destination node D(6).

It is assumed that the source node S knows location information about the destination node D and respective nodes know location information about nodes adjacent thereto. The adjacent nodes refer to nodes within a transmission range (1 hop) of each node. A method for acquiring location information about a destination node D and a method for acquiring location information about adjacent nodes will be described in detail later.

If the destination node D is located outside the transmission range of the source node S, the source node S searches for an adjacent node closest to the destination node D, from among the nodes adjacent thereto. Then, the source node S transmits data, including location information about the destination node D, to the searched adjacent node. If the destination node D is located within the transmission range of the adjacent node that received the data, the adjacent node searches for a node closest to the destination node D from among nodes adjacent to the adjacent node and then transmits data including location information about the destination node D to the searched node. As such, as the process of searching for an adjacent node close to the destination node D and transmitting data to the searched adjacent node is repeated, the destination node D is located within the transmission range of an adjacent node that received data. Consequently, the adjacent node transmits the data to the destination node D.

As shown in FIG. 2, a node 1 is a source node and nodes 2~5 are adjacent nodes of the node 1. A node 6 is a destination node.

The nodes 2~5 adjacent to the node 1 are located within the transmission range of the node 1. The node 1 transmits data to one of the adjacent nodes, which is closest to the destination node D. Of the nodes 2~5, the node 2 is located closest to the node 6. Therefore, the node 1 as a source node S transmits data including location information about the node 6 to the node 2. This transmission method is repeatedly performed until the data are transmitted to the node 6 as the destination node D via node 2.

As described above, when a source node S transmits data to a destination node D, a plurality of adjacent nodes is needed to perform a relaying operation. In an exemplary embodiment of the present invention, the adjacent nodes relaying data are called a "relay node" while the source node S is transmitting data to the destination node D. For example, the node 2 is a relay node. As such, transmitting data through the relay node using location information about the destination node D is called a "geocast technique."

The exemplary embodiment of the present invention is implemented, assuming that the source node S knows the location information about the destination node D. That is, in order to use the routing method according to an exemplary embodiment of the present invention, the source node S preferably acquires location information about the destination node D.

It is assumed that respective nodes know location information about adjacent nodes thereof. The adjacent nodes refer to nodes within the transmission range (1 hop) of each node. In the following description, methods are described to acquire location information about a destination node D and adjacent nodes.

The nodes can acquire their location information through GPS receivers installed thereto, respectively, and the acquired location information is periodically transmitted to the other nodes. In an exemplary embodiment of the present invention, mobility of the nodes exists within the network. Therefore, when nodes that can provide their location information move, they transmit their location information to the other nodes.

Figure 3:
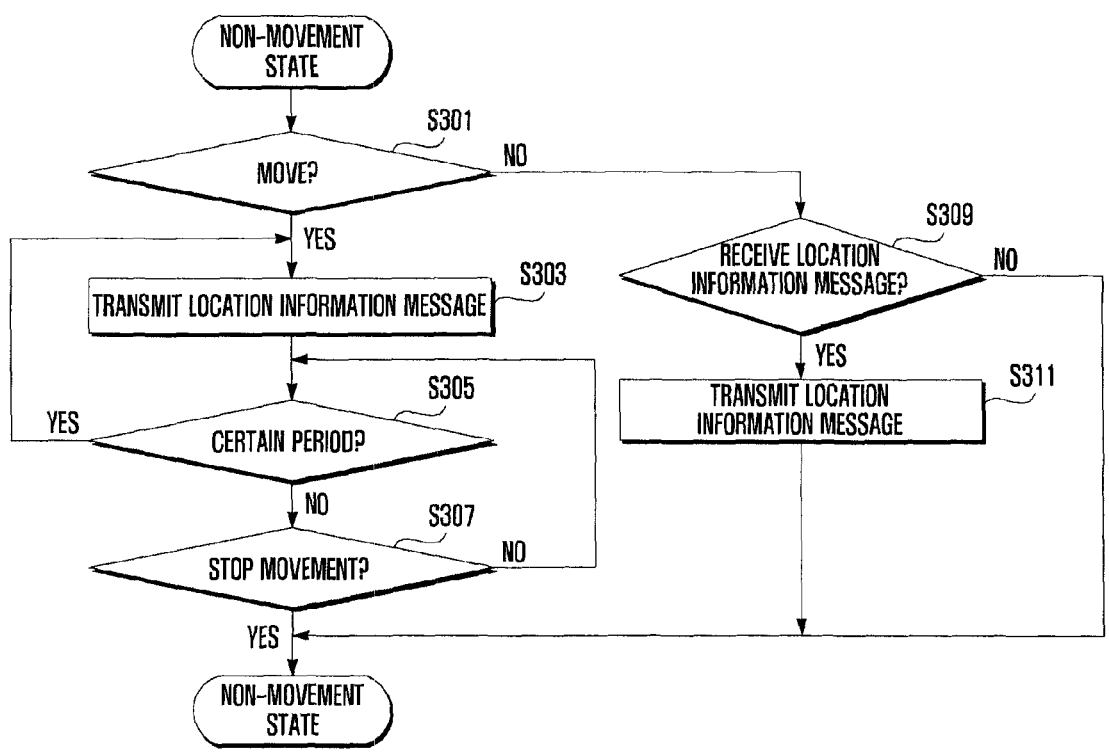
FIG. 3 is a flow chart describing exemplary operation of a method for acquiring location information about a node, according to an exemplary embodiment of the present invention.

In the following description, a method is described in detail where all nodes in the network, including a sensor node, a virtual sink node, and a sink node, acquire location information about adjacent nodes thereof, with reference to FIG. 3. FIG. 3 is a flow chart describing exemplary operation of a method for acquiring location information about a node, according to an exemplary embodiment of the present invention.

In accordance with FIG. 3, a state where a node does not move is hereinafter referred to as a "non-movement state." A non-movement state also refers to a state where a node does not transmit its location information to the other nodes. As shown in FIG. 3, it is assumed that a node is in a non-movement state. The node self-determines whether there is node movement (S301). If the node self-ascertains that the node itself moves at S301, the node transmits a location information message to the other nodes (S303) to provide/update the location information. The location information message includes location information about the node. Transmitting a location information message is performed by a broadcast method. Therefore, when there are nodes adjacent to the node and within the transmission range of the node, they can receive the location information about the node. On the other hand, if the node self-determines that the node itself moves (at S301), the node then determines whether location information messages from other nodes (S309) has been received.

While a node is moving, it periodically transmits a location information message to the other nodes with a certain period. Therefore, the node determines whether the certain period has elapsed to transmit a location information message (S305). If the node ascertains that the certain period has elapsed at S305, it transmits a location information message to the other nodes at S303. Otherwise, the node self-determines whether the node itself has stopped (S307). When the node ascertains that the node itself has stopped (at S307), it transmits its status as being in a non-movement state. Otherwise, it returns to step S305. As such, the node periodically transmits a location information message including its location information to the other nodes adjacent thereto during the movement.

When a node is stationary (does not move), the node may receive location information messages from other nodes. The other nodes may move in or out of the transmission range of the node. Therefore, if the node receives location information messages from other nodes at S309, the node transmits its location information message to the other nodes (S311).

Through the exemplary method described above, the respective nodes in the sensor network can keep location information about their adjacent nodes. As opposed to the conventional method, which is operated in such a way that nodes in the sensor network periodically transmit their location information to the other nodes and wastes large amounts of energy and traffic, the method according to an exemplary embodiment of the present invention operates by considering the mobility of the nodes. Therefore the consideration is such that nodes transmit their location information to other nodes only when they are moving, and thus saves energy and traffic.

Next, a method is described in detail where a source node S acquires location information about a destination node D.

When a destination node D is a sink node, a source node S becomes a virtual sink node. A sink node transmits its location information to a virtual sink node by a unicast method. Such location information transmission is first performed when a sink node designates a virtual sink node or changes the designation of the virtual sink node. In addition, such location information transmission includes a transmission of updated location information of a sink node when the location of the sink node is changed, i.e., as the sink node moves. This movement of the sink node means that the sink node does not transmit its location information to a virtual sink node while it is stationary.

On the other hand, when a destination node D is a virtual sink node, a source node S becomes one of the sensor nodes. In that case, the virtual sink node periodically transmits its location information to the sensor nodes by a broadcast method. The location information about the virtual sink node is flooded. Therefore, all nodes in a network can receive location information about the virtual sink node. That is, all the nodes including sink nodes in a network periodically receive location information about the virtual sink node.

Transmission of location information about a virtual sink node is first performed when one of the plurality of sensor nodes is designated as a virtual sensor node. If the location of a virtual sink node has changed, i.e., a virtual sink node moves, updated location information about the virtual sink node is then transmitted. This means that location information about a virtual sink node is not transmitted while the virtual sink node is not moving, which is similar to transmission of location information about a sink node.

As described above, sink nodes and virtual sink nodes transmit their location information to other nodes. In an exemplary embodiment of the present invention, transmission of location information about a sink node and a virtual sink node may be changed according to the mobility model assumed above. That is, the virtual sink node transmits its location information to the other nodes in different ways, in a random way point model and a group mobility model.

A random way point model provides an environment where a sensor network can control the movements of nodes. When a sink node designates one of the sensor nodes as a virtual sink node in a random way point model, the virtual sink node stops, i.e., does not move, which is referred to as an anchoring state. A virtual sink node in an anchoring state is hereinafter called an "anchor node." The anchor node transmits its location information to the other nodes by a broadcast method. Since the sink node knows the location of its designated virtual sink node, it transmits its own location information to the virtual sink node by a unicast method.

In a group mobility model, since a sensor network cannot control movements of respective nodes, a node designated as a virtual sink node periodically transmits its location information to sensor nodes only while during movement. In addition, the sink node periodically transmits its location information to a virtual sink node only while it is moving.

As described above, the source node S acquires location information about the destination node D and the nodes adjacent thereto, and transmits data to the destination node D through relay nodes from among the adjacent nodes.

According to the exemplary method described above, a sensor node transmits data to a virtual sink node and then the virtual sink node transmits data to a sink node. Actually, a virtual sink node is used in order to transmit data to a sink node. To transmit data using a virtual sink node, a sink node designates at least one of the sensor nodes as a virtual sink node. A sink node can change the designation of a virtual sink node. A virtual sink node preferably has a sufficient amount of energy (remaining battery capacity) to perform its function. To this end, a sink node selects a sensor node, whose energy is greater than a preset critical value, as a virtual sink node. When the energy of the virtual sink node drops below the preset critical value, the virtual sink node informs its energy state of the sink node and then serves as a sensor node. In that case, the sink node selects nodes from among the other sensor nodes, whose energy is greater than a preset critical value, as a virtual sink node. As such, the sensor nodes take turns to perform the function of a virtual sink node.

As shown in FIG. 2, when data is transmitted according to the method shown therein, a hole may occur during the transmission. The occurrence of a hole means that, when a source node is searching for a relay node from among the adjacent nodes to transmit data to a destination node, it cannot locate a corresponding relay node. In that case, the network performs data transmission using the following method. A destination node D transmits its location information to a source node S. If a hole occurs when the source node S transmits data to the destination node D, the transmission route is used through which the destination node D transmitted its location information to the source node S. This method is referred to as a "history technique," where nodes, included in the route set by the history technique, are called "history nodes."

Figure 4:
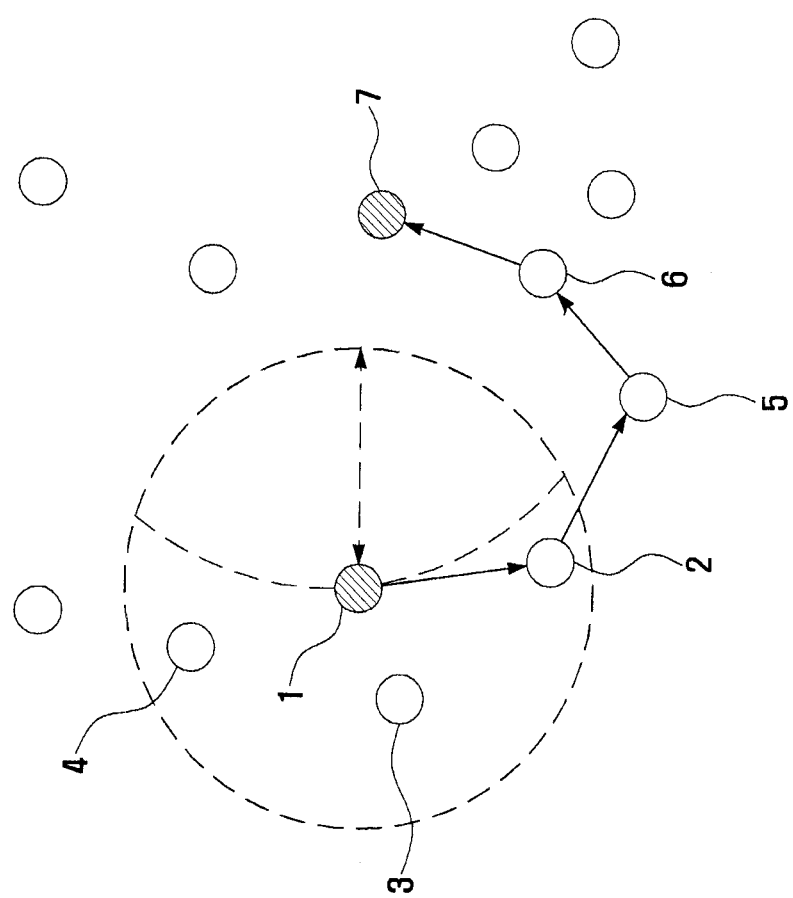
FIG. 4 is a view describing a method for transmitting data using a history technique, according to an exemplary embodiment of the present invention.

In the following description, an exemplary method is described that transmits data using a history technique when a hole occurs, with reference to FIG. 4. FIG. 4 is a view describing a method for transmitting data using a history technique, according to an exemplary embodiment of the present invention.

Referring to FIG. 4, a node 1 is a source node S. Nodes 2~4 are nodes adjacent to the node 1, which are within a transmission range of node 1. Nodes 5 and 6 are not adjacent to the node 1. A node 7 is a destination node D, which is outside the transmission range of node 1.

The node 7 transmits its location information to the node 1. If the node 7 is a sink node, the node 1 becomes a virtual sink node. Here, the node 7 transmits its location information to the node 1 by a unicast method. On the other hand, if the node 7 is a virtual sink node (as opposed to being the sink node), then the node 1 becomes a sensor node. Here, the node 7 transmits its location information thereto by a broadcast method. Since the location information is flooded, the node 1 can receive the location information about the node 7 through flooding.

In FIG. 4, it is assumed that the node 1 receives location information about the node 7 by a series of transmissions through node 6, node 5, and node 2, sequentially. In that case, the node 1 stores location information about the node 2, the node 2 stores location information about the node 5, the node 5 stores location information about the node 6, and the node 6 stores location information about the node 7, respectively. Here, the nodes 2, 5, and 6 are history nodes.

When the node 1 transmits data to the node 7, it first searches for adjacent nodes close to the node 7 as a destination node D rather than its adjacent nodes. After that, the node 1 selects an adjacent node closest to the node 7 from among the searched adjacent nodes and then transmits data thereto. On the contrary, if any node closest to the node 7 is not searched, i.e., a hole occurs, then the node 1 transmits data to the node 2 that is a history node of the node 1. Similarly, the nodes 2, 5 and 6 transmit the data to their history nodes, sequentially and respectively, so that the data can be transmitted to the node 7.

In general, if a hole occurs in a sensor network, a source node S transmits data a node that is close to a destination node D and located at the right of the source node S, using a method called a right hand rule. However, this right hand rule is problematic in that data do not arrive at a destination node and continue to rotate in the right direction with respect to the source node. On the contrary, a history technique provides stable transmission of data to a destination node.

Figure 5:
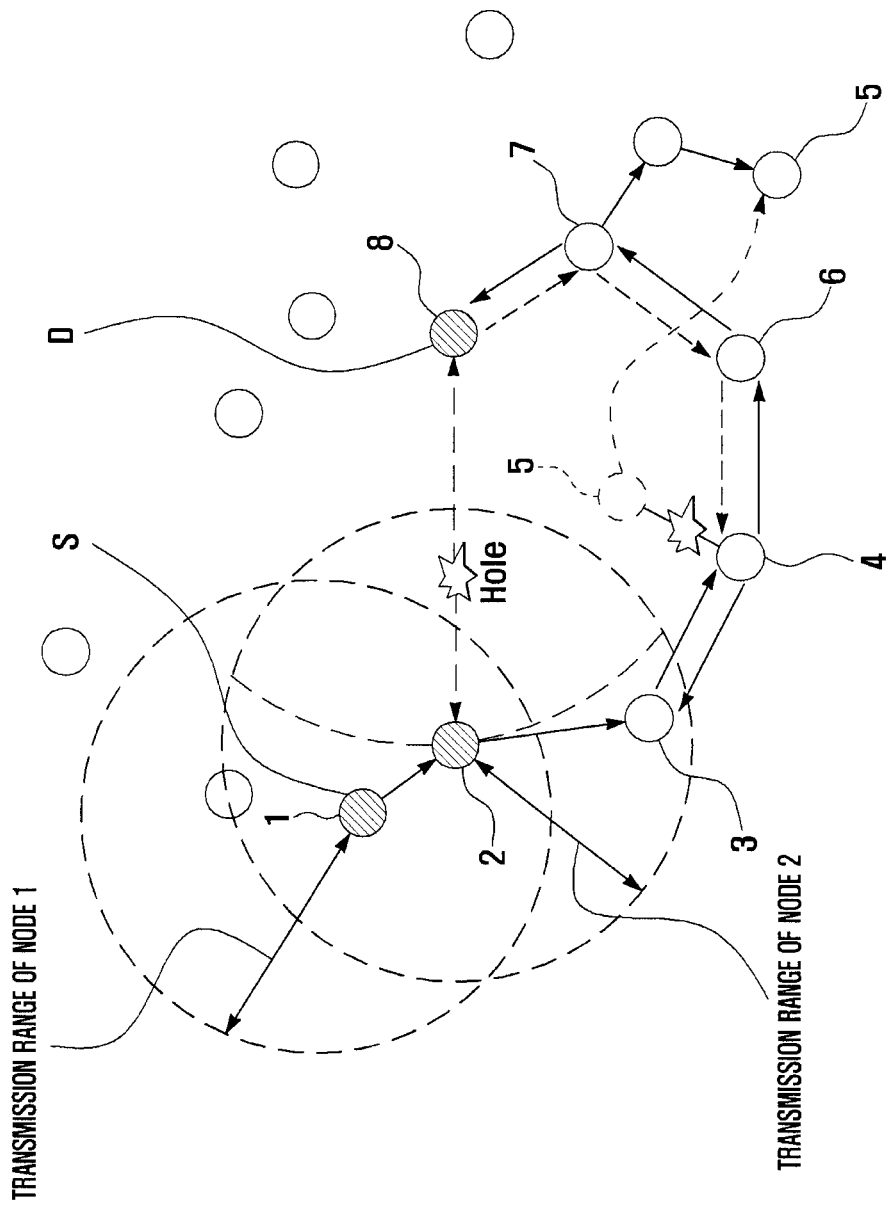
FIG. 5 is a view describing a method for transmitting data when a history node is moved, according to an exemplary embodiment of the present invention.

When a hole occurs during the transmission, and thus the history technique is used, a history node may move due to network mobility. In that case, the history technique has difficulty transmitting data. To resolve this problem, a node transmitting data transmits a routing request message RREQ to a destination node and receives a routing response message RREP therefrom to restore a routing route. In the following description, a method is described that restores a routing route through exchanging routing request and response messages, with reference to FIG. 5. FIG. 5 is a view describing a method for transmitting data when a history node is moved, according to an embodiment of the present invention.

FIG. 5 shows nodes 1~8, wherein in the particular operation discussed herein below, the node 1 is a source node and the node 8 is a destination node.

It is assumed that the node 8 transmits its location information to the other nodes by a broadcast method, so that all the nodes in a network can know the location information of node 8 by flooding. In that case, it is also assumed that the node 1 receives the location information about the node 8 through nodes 7, 5, 4, 3, and 2, sequentially.

The node 1 transmits data to the node 2 according to a virtual geocast technique. In that case, the node 2 intends to transmit the data according to the virtual geocast technique. As shown in FIG. 5, if a hole occurs (two holes are shown in FIG. 5), the node 2 transmits data to the node 3 that is the history node thereof, according to a history technique. The node 3 also transmits data to the node 4 that is the history thereof. During this process, if the node 5, which is the history node of the node 4, has moved out of the transmission range of the node 4, the node 4 cannot transmit data to the node 5. In that case, the node 4 transmits a routing request message RREQ to the other nodes by a broadcast method. When the node 8 (as a destination node D) receives the routing request message RREQ through nodes 6 and 7, sequentially, it transmits a routing response message RREP to the node 4 through the nodes 7 and 6 sequentially. The routing response message RREP is transmitted by a unicast method. As such, when a hole occurs, the route can be restored by a routing request message and a routing response message. Therefore, the node 4 can transmit data to the node 8 through the nodes 6 and 7.

In an exemplary embodiment of the present invention, data are generally transmitted by a geocast technique, but if a hole occurs data are transmitted by a history technique. If a history node moves while data are being transmitted by a history technique, the routing route is restored by exchanging a routing request message and a routing response message.

In the following description, the operations of respective nodes in an exemplary embodiment of FIG. 5 are explained.

Figure 6:
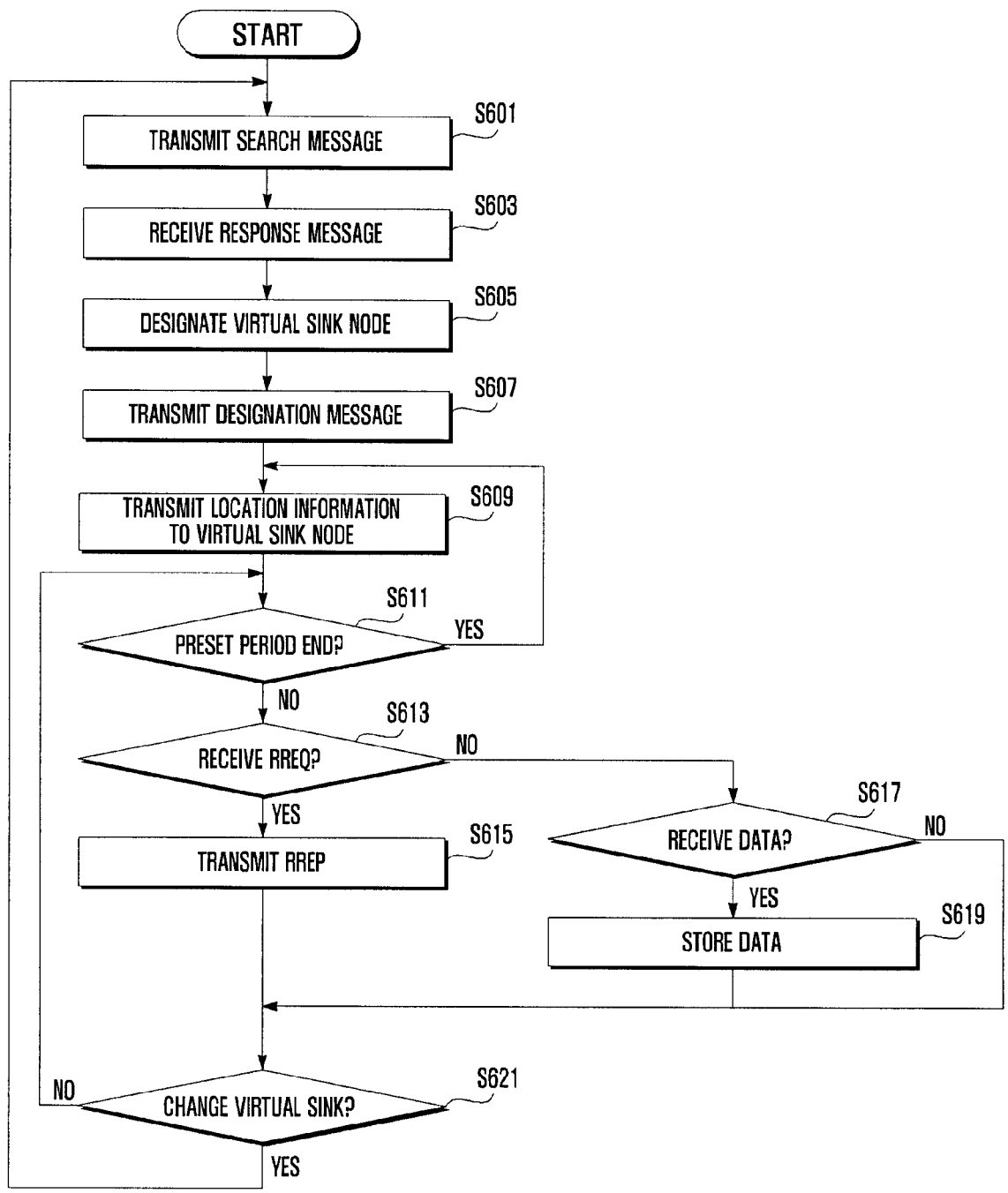
FIG. 6 is a flow chart describing exemplary operation of a method for communication of a sink node, according to an exemplary embodiment of the present invention.

First, a method for communication of a sink node is described with reference to FIG. 6. FIG. 6 is a flow chart providing an overview of an exemplary operation of a method for communication of a sink node, according to an exemplary embodiment of the present invention.

Referring to FIG. 6, the sink node transmits a search message to the other nodes by a broadcast method (S601). The search message may be flooded. The sink node receives response messages from peripheral nodes (S603).

If the search message is flooded the search message can be transmitted by multi-hop. In an exemplary embodiment of the present invention, the peripheral nodes, different from adjacent nodes, refer to nodes within a range of the number of hops that is previously set by a sink node. If a peripheral node is set in two or more hops, the search message is flooded.

The response message, such as received in S603, includes information about the energy consumption and location about a corresponding peripheral node.

In view of the information received at S603, the sink node designates a virtual sink node, considering the energy consumption and location about each of the peripheral nodes, (S605). After designating a virtual sink node, the sink node transmits a designation message, indicating that a virtual sink node was selected, to a corresponding node (S607). After that, the sink node transmits its location information to the designated virtual sink node by a unicast method (S609).

The sink node periodically transmits its location information to the virtual sink node with a certain period. To this end, the sink node determines whether a certain period has elapsed (S611). When the sink node ascertains that a certain period has elapsed at S611, it transmits its location information to the virtual sink node at S609. This procedure reflects mobility of the sink node. On the contrary, when the sink node ascertains (at S611) that a certain period has not elapsed, the sink node determines whether to receive a routing request message RREQ (S613).

The routing request message RREQ is generated as follows. If a hole occurs while the virtual sink node is transmitting data to the sink node, a history technique is used. If a history node moves during the use of the history technique, a node having detected movement of the history node transmits a routing request message RREQ. Therefore, when the sink node receives a routing request message RREQ at S613, it transmits a routing response message RREP to a corresponding node (S615) and then proceeds with step S621. On the contrary, when the sink node does not receive a routing request message RREQ at S613, it determines whether to receive data from the virtual sink node (S617). When the sink node receives data from the virtual sink node at S617, it stores the received data (S619) and then proceeds with step S621. When the sink node does not receive data at S617, it proceeds with step S621.

Still referring to FIG. 6, at step S621, the sink node determines whether to change designation of the virtual sink node. This determination is to reflect a case where a virtual sink node exhausts its energy in such a way that the amount of energy is less than the preset critical value. If the sink node determines a change in the designation of the virtual sink node at S621, it proceeds with step S601, or if not, the sink node proceeds with step S611. This procedure is repeated until the energy of the sink node is exhausted.

Figure 7:
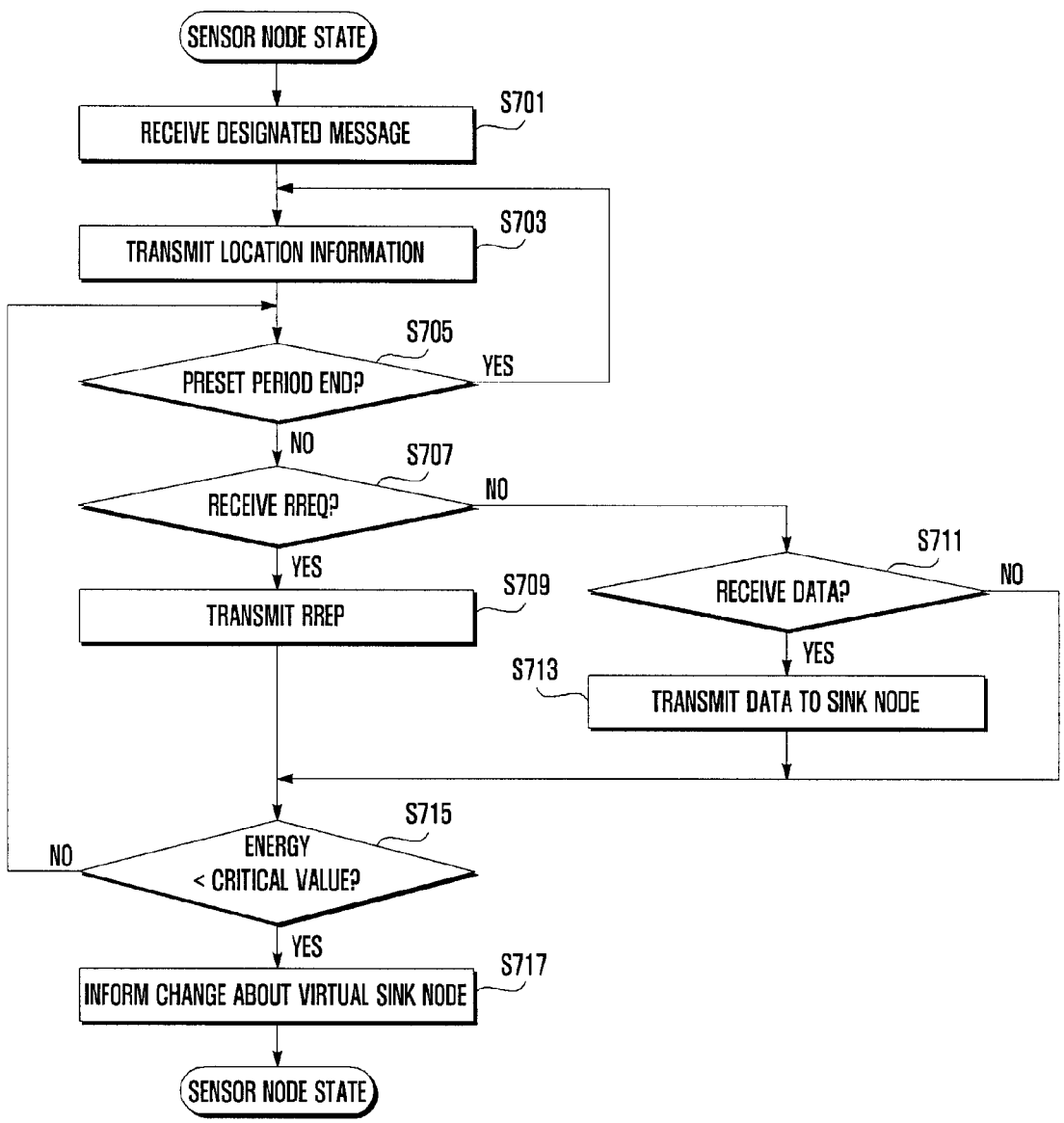
FIG. 7 is a flow chart describing exemplary operation of a method for communication of a virtual sink node, according to an exemplary embodiment of the present invention.

Next, a communication method of a virtual sink node is explained with reference to FIG. 7. FIG. 7 is a flow chart describing a method for communication of a virtual sink node, according to an exemplary embodiment of the present invention.

Referring to FIG. 7, in order to serve as a virtual sink node through one of the sensor nodes, the sensor node must receive a designation message indicating that it was selected as a virtual sink node, as shown in FIG. 6. When a sensor node receives a designation message (S701), it is changed into a virtual sink node. After that, the virtual sink node transmits its location information to the network by a broadcast method (S703). This location information is flooded and thus received by all the nodes including the sink node.

The virtual sink node periodically transmits its location information to the network by a broadcast method. To this end, the virtual sink node determines whether a preset period arrives (S705). When the virtual sink node ascertains that a preset period arrives at S705, it transmits its location information to the network by a broadcast method at S703. This procedure reflects the mobility of the virtual sink node. On the contrary, when the virtual sink node ascertains that a preset period does not arrive at S705, the virtual sink node then determines whether to receive a routing request message RREQ (S707).

As described above, the routing request message RREQ is generated below. If a history node moves while the sensor network is transmitting data using a history technique, a node having detected movement of the history node transmits a routing request message RREQ. Therefore, when the virtual sink node receives a routing request message RREQ at S707, the virtual sink node then transmits a routing response message RREP to a corresponding node (S709) and then proceeds with step S715. On the contrary, when the virtual sink node does not receive a routing request message RREQ at S707, the virtual sink node determines whether to receive data from the sensor node (S711). When the virtual sink node receives data from the sensor node at S711, the virtual sink node then transmits the received data to the sink node and then proceeds with step S715. When the virtual sink node does not receive data at S711, the virtual sink node proceeds with step S715.

At step S715, the virtual sink node measures its own energy and determines whether its amount of energy is less than a critical value. When the virtual sink node ascertains (at S715) that its amount of energy is less than a critical value, the virtual sink node transmits a message indicating change of designation regarding a virtual sink node to the sink node (S717) and is then changed into a sensor node. On the contrary, when the virtual sink node ascertains that its amount of energy is equal to or greater than a critical value at S715, the operation proceeds with step S705 and the virtual sink node continues to serve as a virtual sink node.

Figure 8:
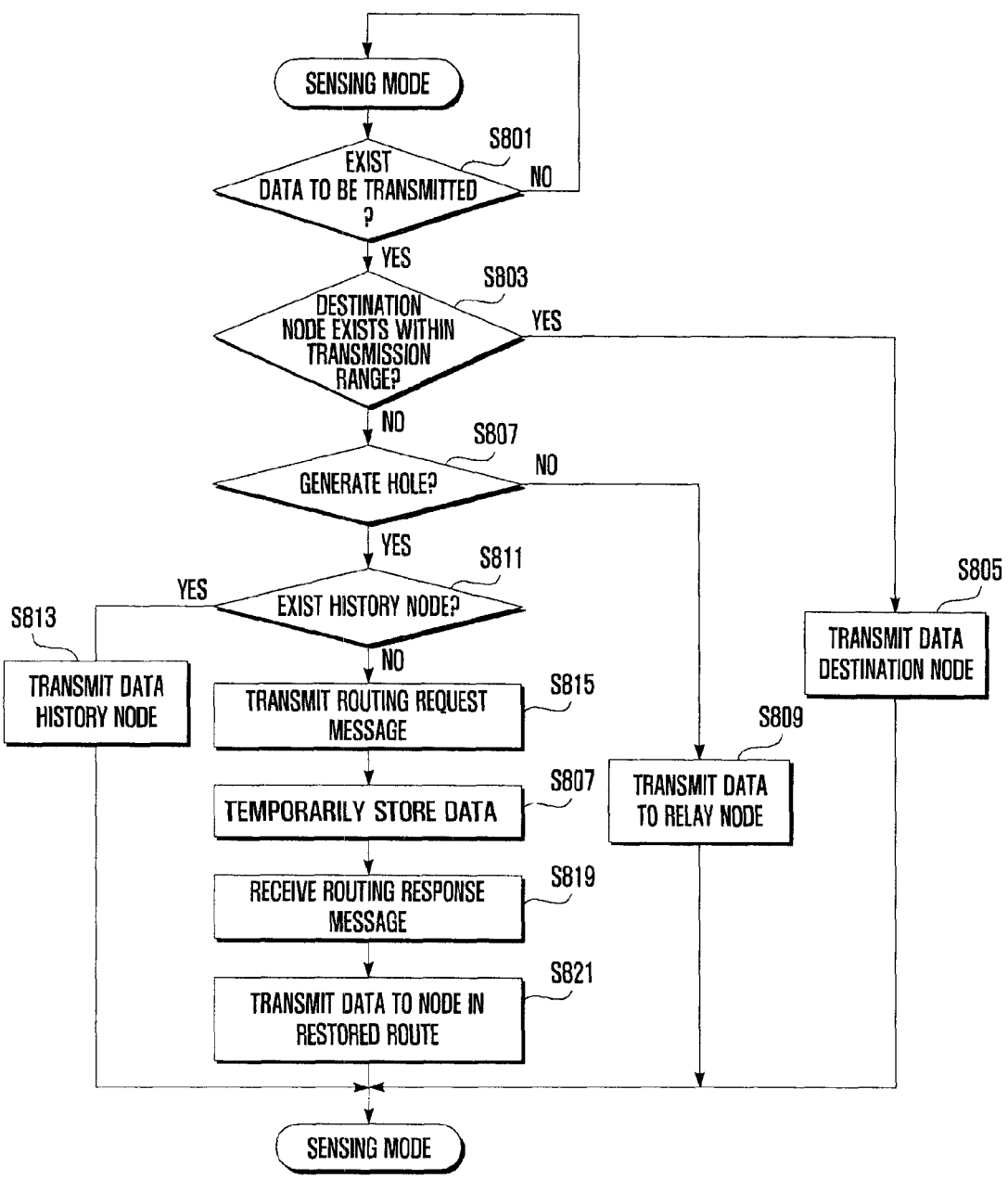
FIG. 8 is a flow chart describing exemplary operation of a method for communication of a sensor node, according to an exemplary embodiment of the present invention.

In the following description, a communication method of a sensor node including a source node and relay nodes is explained with reference to FIG. 8. FIG. 8 is a flow chart illustrating exemplary operation of a method for communication of a sensor node, according to an exemplary embodiment of the present invention.

In FIG. 8, it is assumed that the sensor node includes a source node and relay nodes, and is collecting particular data, whose state is called a "sensing mode". It is also assumed that the sensor node stores location information about a destination node and adjacent nodes, which has been already described above.

During the sensing mode, the sensor node determines whether there are data to be transmitted (S801). Here, the data may be data that the sensor node receives from other nodes, or data that sensed by the sensor node itself. The data include location information about a destination node.

When the sensor node ascertains that there are data to be transmitted at S801, the sensor node determines whether a destination node is within the sensor node's transmission range (S803). When the sensor node ascertains that a destination node is within the sensor node's transmission range at S803, the sensor node transmits data to the destination node (S805) and then is operated in a sensing mode.

When the sensor node ascertains that a destination node is not within its transmission range at S803, the sensor node may transmit data by a geocast method. To transmit data by a geocast method, a hole must not occur. Therefore, the sensor node determines whether a hole occurs (S807). When a hole does not occur at S807, the sensor node transmits data to a relay node (S809) and then is operated in a sensing mode.

On the contrary, when a hole occurs at S807, the sensor node must transmit data to the other nodes according to a history technique. To this end, the sensor node determines whether a history node exists (S811). That is, the determination is regarding whether there is a history node of the sensor node moving. Therefore, when a history node of the sensor node does not move, or exists, at S811, the sensor node transmits data to the history node (S813) and then is operated in a sensing mode.

On the contrary, when a history node moves, or does not exist, at S811, the sensor node cannot transmit data according to the history technique. In that case, the sensor node transmits a routing request message (S815). The routing request message is transmitted by a broadcast method and flooded. After that, the sensor node temporarily stores data (S817). Next, the sensor node receives a routing response message in response to the routing request message (S819). Therefore, the sensor node can restore the transmission route. After that, the sensor node having received the routing response message transmits data to the node through the restored route (S821) and then is operated in a sensing mode.

As described above, according to the present invention, a network environment can be achieved that is adapted to many-to-one communication through a virtual sink node. Flooding to transmit location information can also be reduced. Since data can be transmitted through geographical location information as GPS information, a complicated routing process can be omitted. Since location information is updated and maintained considering mobility, transmission failure can be reduced. Consequently, network performance can be enhanced.

Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims. The appended claims are not limited to the exemplary embodiments shown and described herein.

What is claimed is:

1. An electronic device for use in a sensor network, the electronic device comprising a wireless transceiver and a processor, the electronic device being operable as a sink node and a virtual sink node of the sensor network, wherein:

when the electronic device operates as a sink node, the electronic device is configured to: designate a sensor node in the sensor network as a virtual sink node based on the sensor node having an operating energy that exceeds a threshold, receive, via the sensor node, data transmitted by other sensor nodes in the sensor network, and receive from the sensor node a message relinquishing the sensor node's designation as a virtual sink node; and when the electronic device operates as a virtual sink node, the electronic device is configured to: route data received from sensor nodes of the sensor network to a first sink node of the sensor network, determine an operating energy of the electronic device, and transmit to the first sink node a message relinquishing the electronic device's designation as a virtual sink node, the message being transmitted in response to the operating energy of the electronic device falling below the threshold.

2. The electronic device of claim 1, wherein the electronic device is configured to transmit an update of a location of the electronic device by using a transmission method that is based on a role of the electronic device in the sensor network.

3. The electronic device of claim 2, wherein the update of the location of the electronic device is transmitted by using a unicast method when the electronic device is operating as a sink node, and the update of the location of the electronic device is transmitted by a broadcast method when the electronic device is operating as a virtual sink node.

4. The electronic device of claim 1, wherein the routing of data received from the sensor nodes of the sensor network to the first sink node of the sensor network comprises:
selecting a relay node within a transmission range of electronic device, the relay node being selected from a plurality of potential relay nodes based on being located at the shortest distance from the first sink node; and
transmitting the data to the relay node for further transmission towards the first sink node.

5. The electronic device of claim 1, wherein the routing of data received from the sensor nodes of the sensor network to the first sink node of the sensor network comprises transmitting the data to the first sink node via a sensor node previously used to deliver a message from the first sink node to the electronic device.

6. The electronic device of claim 1, wherein the routing of data received from the sensor nodes of the sensor network to the first sink node of the sensor network comprises:
transmitting to the first sink node a routing request(RREQ) message:
receiving from the first sink node a routing response (RREP) message in response to the (RREQ) message; and
transmitting the data via a sensor node that is used to deliver the RREP message from the first sink node to the electronic device.

7. The electronic device of claim 1, wherein the routing of data received from the sensor nodes of the sensor network to the first sink node of the sensor network comprises communicating a location of the electronic device to the sensor nodes of the sensor network by using a flooding technique.

8. The electronic device of claim 7, wherein the location of the electronic device is determined by using a Global Positioning System (GPS) receiver.

9. The electronic device of claim 1, wherein the electronic device is configured to store in the memory location information about nodes in the sensor network that are adjacent to the electronic device.

10. A method for use in a sensor network having a plurality of sensor nodes and a sink node, the method comprising:
designating, by the sink node, a first sensor node as a virtual sink node based on the first sensor node having an operating energy that exceeds a threshold;
receiving, by the sink node, data gathered by the plurality of sensor nodes, the data being received through the first sensor node while the first sensor node is operating as a virtual sink node;
receiving, by the sink node, a message from the first sensor node relinquishing the first sensor node's designation as a virtual sink node, the message being transmitted based on the operating energy of the first sensor node falling below the threshold; and
designating, by the sink node, a second sensor node as a virtual sink node when the message relinquishing the first sensor node's designation as a virtual sink node is received.

11. The method of claim 10, further comprising:
receiving, by the virtual sink node, a routing request(R-REQ) message that is broadcast by the first sensor node while the first sensor node is operating as a virtual sink node; and
transmitting, by the virtual sink node, a routing response (RREP) message to the first sensor node, via a unicast method, wherein the RREP message is transmitted over a communications path used to deliver the RREQ message to the sink node.

12. The method of claim 10, further comprising transmitting, by the sink node, locational updates only when the sink node is moving.

13. The method of claim 10, wherein virtual sink nodes designated by the sink node include nodes operable to receive data from the plurality of sensor nodes and forward the received data to the sink node.

14. The method of claim 10, further comprising transmitting an indication of a location of the sink node to the first sensor node via a unicast method when the first sensor node is designated as a virtual sink node.

15. The method of claim 10, wherein the sink node comprises a memory, a processor, and a transceiver.

16. A method for use in a sensor network having a plurality of sensor nodes, the method comprising:
receiving, by a first sensor node, a message designating the first sensor node as a virtual sink node, the message being transmitted by a sink node;
while the first sensor node is operating as a virtual sink node:
receiving, at the first sensor node, data gathered by the plurality of nodes and forwarding the received data to the sink node,
repeatedly testing by the first sensor node whether an operating energy of the first sensor node is below a threshold, and
transmitting to the sink node, by the first sensor node, a message relinquishing the first sensor node's designation as a virtual sink node, the message being transmitted based on an operating power of the first sensor node falling below a threshold.

17. The method of claim 16, further comprising:
receiving, by the first sensor node, an indication of a location of a second sensor node that is located outside of a transmission range of the first sensor node, the second sensor node operating as a virtual sink node, and the indication of the location of the second sensor node being disseminated across the sensor network by using a flooding technique responsive to the second sensor node being designated as a virtual sink node;
gathering data by using a sensor that is part of the first sensor node; and
transmitting, by the first sensor node, the data to the second sensor node;
wherein while the second sensor node operates as a virtual sink node, the second sensor node receives data gathered by the plurality of sensor nodes and forwards the received data to the sink node.

18. The method of claim 17, wherein transmitting the data to the second sensor node comprises:
selecting a relay node within the transmission range of the first sensor node, the relay node being selected from a plurality of potential relay nodes based on being located at the shortest distance from the location of the second sensor node; and
transmitting the data from the first sensor node to the relay node for further transmission towards the second sensor node.

19. The method of claim 17, wherein transmitting the data to the second sensor node comprises transmitting the data to the second sensor node via a third sensor node previously used to deliver a message from the second sensor node to the first sensor node.

20. The method of claim 17, wherein transmitting the data to the second sensor node comprises:
transmitting to the second sensor node a routing request (RREQ) message;
receiving for the second sensor node a routing response (RREP) message in response to the (RREQ) message; and
transmitting the data via a third sensor node that is used to deliver the RREP message from the second sensor node to the first sensor node.

21. The method claim 16, transmitting, by the first sensor node, updates on a location of the first sensor node only while the first sensor node is moving.

22. The method of claim 16, transmitting by the fist sensor node an indication of a location of the first sensor node, wherein the indication of the location of the first sensor node is transmitted to a second sensor node in response to detecting that the second node had become located within a transmission range of the first sensor node.

23. The method of claim 16, wherein the sink node includes a node operable to collect data gathered by the plurality of sensor nodes.

24. The method of claim 16, wherein a location of the first sensor node is updated when the first sensor mode moves.

25. The method of claim 16, wherein the first sensor node comprises a transceiver and a processor.

26. The method of claim 16, wherein the sink node comprises a transceiver and a processor.

* * * * *

UNITED STATES PATENT AND TRADEMARK OFFICE
CERTIFICATE OF CORRECTION

PATENT NO.         : 8,856,227 B2
APPLICATION NO.    : 12/370709
DATED              : October 7, 2014
INVENTOR(S)        : Hyo Hyun Choi et al.

Page 1 of 1

It is certified that error appears in the above-identified patent and that said Letters Patent is hereby corrected as shown below:

In the Claims,

Column 16, Claim 20, Line 37 should read as follows:
--...receiving from the second...--

Column 16, Claim 21, Line 43 should read as follows:
--...The method of claim...--

Column 16, Claim 24, Line 56 should read as follows:
--...first sensor node moves...--

Signed and Sealed this
Thirtieth Day of December, 2014

Michelle K. Lee
*Deputy Director of the United States Patent and Trademark Office*